United States Patent
Henry et al.

(10) Patent No.: US 10,798,383 B2
(45) Date of Patent: Oct. 6, 2020

(54) METHOD FOR DECODING A DIGITAL IMAGE, CODING METHOD, DEVICES, TERMINAL AND ASSOCIATED COMPUTER PROGRAMS

(71) Applicant: B<>COM, Cesson Sevigne (FR)

(72) Inventors: Felix Henry, Saint Gregoire (FR); Gordon Clare, Pace (FR)

(73) Assignee: B<>COM, Cesson Sevigne (FR)

( * ) Notice: Subject to any disclaimer, the term of this patent is extended or adjusted under 35 U.S.C. 154(b) by 0 days.

(21) Appl. No.: 16/320,798

(22) PCT Filed: Jul. 12, 2017

(86) PCT No.: PCT/FR2017/051911
§ 371 (c)(1),
(2) Date: Jan. 25, 2019

(87) PCT Pub. No.: WO2018/020100
PCT Pub. Date: Feb. 1, 2018

(65) Prior Publication Data
US 2019/0158841 A1    May 23, 2019

(30) Foreign Application Priority Data
Jul. 28, 2016 (FR) ..................... 16 57334

(51) Int. Cl.
*H04N 19/13* (2014.01)
*H04N 19/136* (2014.01)
(Continued)

(52) U.S. Cl.
CPC ........... *H04N 19/13* (2014.11); *H04N 19/132* (2014.11); *H04N 19/176* (2014.11);
(Continued)

(58) Field of Classification Search
CPC .... H04N 19/895; H04N 19/13; H04N 19/136; H04N 19/184
(Continued)

(56) References Cited

U.S. PATENT DOCUMENTS

2013/0083856 A1    4/2013  Sole Rojals et al.
2014/0177707 A1*   6/2014  George ................ H04N 19/513
                                                              375/240.03

FOREIGN PATENT DOCUMENTS

| CN | 101808248 A |   | 8/2010 |            |
|----|-------------|---|--------|------------|
| GB | 2478996 A   | * | 9/2011 | H04N 19/895|
| JP | 5869115 A   |   | 2/2016 |            |

OTHER PUBLICATIONS

English translation of the International Written Opinion dated Oct. 25, 2017 for corresponding International Application No. PCT/FR2017/051911, filed Jul. 12, 2017.
(Continued)

*Primary Examiner* — Albert Kir
(74) *Attorney, Agent, or Firm* — David D. Brush; Westman, Champlin & Koehler, P.A.

(57) ABSTRACT

A method for decoding a stream having first and second portions portion and representing an image divided into blocks. The method includes a sequence test having a predetermined non-zero number of bits, including two at the power of the predetermined number ($2^N$) iterations of the following substeps, for a current block: obtaining a sequence distinct from sequences already tested; decoding and reconstructing a version of the current block from the obtained sequence and from coded data in the first portion; evaluating a likelihood measurement associated with the reconstructed block; decoding information characteristic of a first sequence including the predetermined number of binary symbols from the second portion; selecting a sequence from the sequences tested, based on the likelihood measurements
(Continued)

Figure 1:
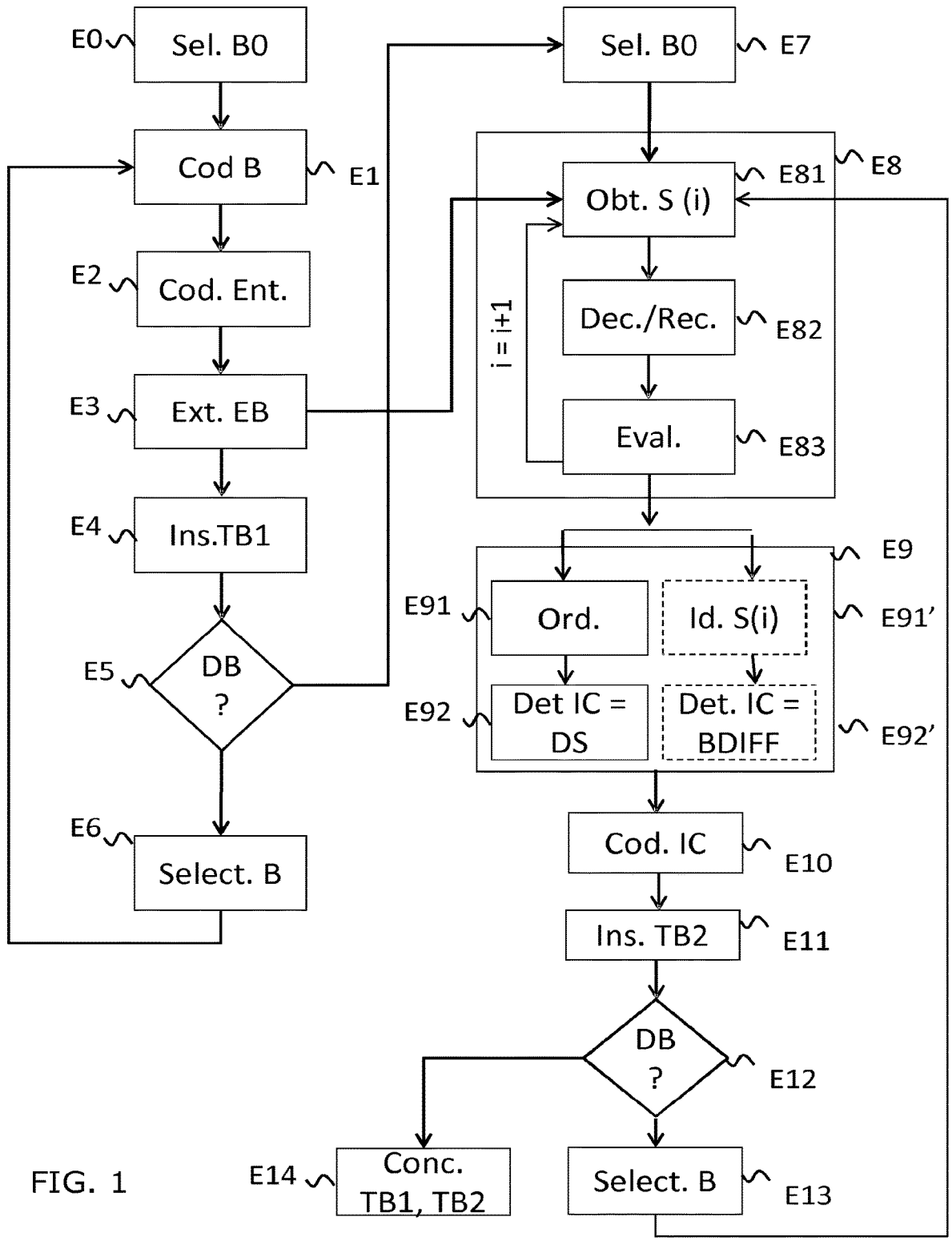

and the decoded information, the selected sequence being identified as the first sequence; and decoding and reconstructing the current block from the first sequence and the first portion.

14 Claims, 8 Drawing Sheets

(51) Int. Cl.
    *H04N 19/184* (2014.01)
    *H04N 19/132* (2014.01)
    *H04N 19/85* (2014.01)
    *H04N 19/91* (2014.01)
    *H04N 19/176* (2014.01)
    *H04N 19/70* (2014.01)
    *H04N 19/895* (2014.01)
    *H04N 19/40* (2014.01)

(52) U.S. Cl.
    CPC ......... *H04N 19/184* (2014.11); *H04N 19/70* (2014.11); *H04N 19/85* (2014.11); *H04N 19/91* (2014.11); *H04N 19/40* (2014.11)

(58) Field of Classification Search
    USPC ............ 375/240.02, 240.03, 240.06, 240.07, 375/240.23, 240.24
    See application file for complete search history.

(56) References Cited

OTHER PUBLICATIONS

Damian Karwowski et al., "Improved Context-Based Adaptive Binary Arithmetic Coding in MPEG-4 AVC/H.264 Video Codec", Sep. 20, 2010 (Sep. 20, 2010), Computer Vision and Graphics Springer Berlin Heidelberg, Berlin, Heidelberg, pp. 25-32, XP019152987.

Jin Heo et al., "Improved Context-Based Adaptive Binary Arithmetic Coding Over H.264/AVC for Lossless Depth Map Coding", IEEE Signal Processing Letters, IEEE Service Center, Piscataway, NJ, US, vol. 17, No. 10, Oct. 1, 2010 (Oct. 1, 2010), pp. 835-838, XP011313089.

D. Marpe et al., "Context-based adaptive binary arithmetic coding in the H.264/AVC video compression standard", IEEE Transactions on Circuits and Systems for Video Technology, vol. 13, No. 7, Jul. 1, 2003 (Jul. 1, 2003), pp. 620-636, XP055119784.

Matthias Wien, "High Efficiency Video Coding, Coding Tools and Specification", Signals and Communication Technology, 2015.

International Telecommunication Union, ITU-T Telecommunication Standardization Sector of ITU, H.265, "Series H: Audiovisual and Multimedia Systems Infrastructure of audiovisual services—Coding of moving video", Feb. 2018.

International Search Report dated Oct. 25, 2017 for corresponding International Application No. PCT/FR2017/051911, filed Jul. 12, 2017.

International Written Opinion dated Oct. 25, 2017 for corresponding International Application No. PCT/FR2017/051911, filed Jul. 12, 2017.

* cited by examiner

METHOD FOR DECODING A DIGITAL IMAGE, CODING METHOD, DEVICES, TERMINAL AND ASSOCIATED COMPUTER PROGRAMS

1. CROSS-REFERENCE TO RELATED APPLICATIONS

This Application is a Section 371 National Stage Application of International Application No. PCT/FR2017/051911, filed Jul. 12, 2017, the content of which is incorporated herein by reference in its entirety, and published as WO 2018/020100 on Feb. 1, 2018, not in English.

2. FIELD OF THE INVENTION

The field of the invention is that of the encoding and decoding of images or sequences of images, and in particular of video streams.

More specifically, the invention relates to the compression of images or sequences of images using a block representation of the images.

The invention may especially apply to the image or video encoding implemented in the current encoders (JPEG, MPEG, H.264, HEVC, etc. and their amendments) or to future ones, and to the corresponding decoding process.

3. PRIOR ART

Images and digital image sequences occupy a lot of space in terms of memory, which requires, when transmitting these images, to compress them in order to avoid congestion problems on the network used for this transmission. Indeed, the usable throughput on this network is generally limited.

Numerous video data compression techniques are already known, among which the HEVC compression standard ("High Efficiency Video Coding, Coding Tools and Specification", Matthias Wien, Signals and Communication Technology, 2015).

In relation to FIG. 1, an original video consisting of a sequence of M images I1, I2, . . . IM, with M a non-zero integer, is considered. The images are encoded by an encoder, the coded data are inserted into a stream of coded data or bitstream TB transmitted to a decoder via a communication network, or a compressed file FC, intended to be stored on a hard disk for example. The decoder extracts the coded data and then processes them in a predefined order known from the encoder and the decoder, for example in the time order I1, then I2, . . . , then IM, this order being able to differ according to the embodiment.

When encoding an image Im, with m an integer between 1 and M, it is subdivided into blocks of maximum size which can in turn be subdivided into smaller blocks. Each block C will undergo an encoding or decoding operation consisting of a series of operations, including in a non-exhaustive manner a prediction, a residual calculation of the current block, a transformation of the pixels of the current block into coefficients, a quantisation of the coefficients and entropy coding of the quantised coefficients.

The processing of a current block C implements a coding scheme, for example as specified in the HEVC standard, in the document "ISO/IEC 23008-2:2013—High efficiency coding and media delivery in heterogeneous environments—Part 2: High efficiency video coding», International Organization for Standardization, published in November 2013.

It provides a set of description elements of the current block C. These description elements can be of various types. Non-exhaustively, they include in particular:
- the information relating to coding choices of the current block C, for example a coding mode of the current block, such as the INTRA, INTER or SKIP mode, a prediction mode of the current block, among the 35 prediction modes of a INTRA block, a prediction mode of an estimated motion vector for the current block, or the amplitude of a coefficient, known per se in HEVC;
- the data values to be encoded, such as the components of a motion vector, the amplitude or the sign of a coefficient;
- etc These descriptive elements are then coded, for example by Huffman coding or arithmetic coding or any other known entropy coding technique, into a sequence of binary symbols which is inserted into the encoded data stream.

4. DISADVANTAGES OF THE PRIOR ART

A disadvantage of the prior art is that despite the high compression ratio obtained by the HEVC coding scheme, the encoded data stream has dimensions which are too great for some multimedia content, such as high dynamic range or HDR or still video's high frame rate or HFR of the order of 120 or 240 images per second.

5. SUMMARY OF THE INVENTION

An exemplary embodiment of the invention relates to a method for decoding an encoded data stream representative of at least one image, said image being divided into blocks, said stream comprising a first portion and a second portion.

According to the invention, the decoding method comprises a sequence test step comprising a predetermined non-zero number of bits, said step comprising two at the power of the predetermined number of iterations of the following substeps, for said current block:
- obtaining a sequence distinct from the sequences already tested;
- decoding and reconstructing a version of the current block from the obtained bit sequence and from coded data read in the first stream portion;
- evaluating a likelihood measurement associated with the sequence obtained from the version of the reconstructed block.

It further comprises the following steps:
- decoding a characteristic information of a first sequence comprising the predetermined non-zero number of binary symbols from the second stream portion;
- selecting a sequence from the sequences tested, based on the likelihood measurements associated with the sequences tested and the decoded information, said selected sequence being identified as the first sequence; and
- decoding and reconstructing the current block from the first sequence and the first stream portion.

The invention also relates to a method for coding a coded data stream representative of at least one image, said image being divided into blocks, characterised in that it comprises the following steps, implemented for a current block:
- encoding the current block into a plurality of encoded data;
- extracting the plurality of encoded data from a first sequence comprising a predetermined non-zero number of binary symbols;

inserting, into a first stream portion, binary symbols coded data not belonging to the extracted sequence.

It comprises a sequence test step including a predetermined non-zero number of binary symbols, said step including two at the power of the predetermined number of iterations of the following sub-steps:

obtaining a sequence distinct from the sequences already tested;

decoding and reconstructing a version of the current block from the obtained bit sequence and from coded data read in the first stream portion;

valuating a likelihood measurement associated with the sequence obtained from the version of the reconstructed block;

and it further comprises a step of determining a characteristic information of the first sequence and a step of encoding said information in a second portion of the stream.

With the invention, an encoder produces coded data relating to the current block, from which it extracts a bit sequence, which it does not insert into the first stream portion. On the other hand, it inserts in the second stream portion a piece of information characteristic of the extracted sequence, which the decoder can use to reconstruct this sequence. The invention therefore proposes an entirely new and inventive approach to image coding, which consists in deleting part of the data encoded according to a conventional compression scheme and in transmitting, in their stead, a piece of information of smaller size, which allows the decoder to reconstruct the missing data.

With the invention, a decoder receives a coded data stream comprising two portions, a first portion comprising a subset of the data coded by the coder to represent the current block and a second portion comprising a piece of complementary signalling information, characteristic of a coded data sequence that is missing from the first stream portion.

The invention thus proposes an entirely new and inventive approach to image compression, which consists in truncating the coded data by the coder of a predetermined number of binary symbols, the truncated symbols being able to be reconstructed by the decoder. by testing different hypotheses and from the complementary information transmitted by the coder in the second stream portion.

The use of a likelihood measurement maximisation criterion allows the decoder to identify the correct hypothesis with good reliability. Since the probability for a hypothesis to be correct is not associated with a uniform distribution, the complementary information can be encoded efficiently, using fewer bits than the truncated sequence.

In this way, the data stream obtained is reduced in size.

The various embodiments or features mentioned below may be added independently or in combination with each other, to the characteristics of the decoding method and/or coding method defined above.

According to one aspect of the invention, the method comprises a step of sorting the sequences tested according to decreasing associated likelihood measurement values and the characteristic information of the first sequence comprises a rank of the first sequence among the sorted sequences.

One advantage is that since the first sequence is generally associated with a high likelihood measurement, the corresponding rank is small and generates a reduced signalling cost.

According to another aspect of the invention, the method comprises a step of determining the most probable tested sequence and the information characteristic of the first sequence comprises measuring a bitwise difference between the value of the first sequence and that of the most probable sequence.

One advantage is that it is not necessary to sort all the sequences tested, only to determine the most probable one. A further advantage lies in the fact that the number of bits processed remains constant, regardless whether it relates to the bits of the sequence tested or the bitwise differences that can each be coded on 1 bit. So, all these data can be processed on architectures with constant bit lengths, typically a multiple of 8, which allows a simple implementation on an electronic circuit that handles bytes preferably.

According to another aspect of the invention, the evaluation step comprises calculating a distortion measurement of the pixel values on both side of at least one boundary of the current block with a neighbouring block already processed and the likelihood measurement evaluated is inversely proportional to the distortion measurement.

An advantage of this measurement is to be reliable for natural images whose nearby pixels have strongly correlated values.

According to yet another aspect of the invention, the decoding and reconstruction step completes the first stream portion by inserting at least one portion of the bits of the sequence at at least one predetermined position.

The encoder extracts the bits from the encoded data at positions which are known to the decoder beforehand. In this way, it is not necessary to provide signalling.

According to another aspect of the invention, the determined position is located before the first bit of the coded data associated with the current block.

An advantage of this embodiment lies, on the one hand, in its simplicity and, on the other hand, to guarantee that it will always be possible to delete at least some bits of the coded data relating to the current block, even if they are reduced in size.

According to yet another aspect of the invention, the decoding method includes a step of reconstructing a coded data stream completed from the first stream portion and the selected sequence.

One advantage is to reconstruct a complete data stream that can be decoded by a conventional decoder during a second pass.

According to another aspect of the invention, the decoding method comprises a storage step in a memory of the reconstructed block.

One advantage is to allow the reconstruction of the reconstructed image without requiring a second decoding pass.

Advantageously, the decoding steps include finite state entropy decoding, the storing step further comprises storing a state of the entropy decoder associated with the selected sequence.

In this way, the entropic decoder can, after the test of the $2^N$ hypotheses, reposition itself on the state associated with the correct hypothesis before starting to decode of the next block.

The various embodiments or features mentioned below may be added independently or in combination with each other, to the characteristics of the decoding method and/or coding method defined above.

The invention also relates to a decoding device adapted to implement the decoding method according to any one of the particular embodiments defined above. This decoding device may of course comprise the various characteristics relating to the decoding method according to the invention.

Thus, the characteristics and advantages of this decoding device are the same as those of the decoding method, and are not detailed further.

According to a particular embodiment of the invention, such a decoding device is included in a terminal.

The invention also relates to a coding device adapted to implement the coding method according to any one of the particular embodiments defined above. This coding device may of course comprise the various characteristics relating to the coding method according to the invention. Thus, the characteristics and advantages of this coding device are the same as those of the coding method, and are not detailed further.

According to a particular embodiment of the invention, such a coding device is included in a terminal or a server.

Correlatively, the invention also relates to a terminal equipment comprising a decoding device and/or a coding device which have just been described.

The invention also relates to a signal carrying a coded data stream representative of at least one digital image, said digital image being divided into blocks of processed pixels in a defined order, characterised in that the coded data stream comprises, for a current block, at least a first stream portion comprising encoded data representative of syntax elements of the current block and a second stream portion comprising information characteristic of a first sequence comprising a predetermined non-zero number of bits, and in that, on receiving said signal, a decoder is able to identify the first bit sequence from the coded information and to reconstruct the current block from the decoded data of the first stream portion and the first sequence identified.

The decoding method, respectively the coding method according to the invention can be implemented in various ways, particularly in hard-wired form or in software form.

According to a particular embodiment of the invention, the decoding method, respectively the coding method, is implemented by a computer program. The invention also relates to a computer program comprising instructions for implementing the decoding method or the coding method according to any particular embodiments described previously, when this program is executed by a processor. Such a program can use any programming language. It can be downloaded from a communication network and/or recorded on a computer-readable medium.

This program can use any programming language, and be in the form of a source code, an object code, or an intermediate code between a source code and an object code, such as in a partially compiled form, or in any other desirable form.

The invention also relates to a recording medium or a computer-readable information medium, and comprising instructions of a computer program as mentioned above. The recording media mentioned above can be any entity or device capable of storing the program. For example, the medium may comprise storage means, such as a ROM, for example a CD ROM or a microelectronic circuit ROM, or a recording medium, for example a magnetic medium such as a hard disk. On the other hand, the recording media may correspond to a transmissible medium such as an electrical or optical signal, which may be conveyed via an electrical or optical cable, by radio or by other means. The program according to the invention can in particular be downloaded on an Internet type network. Alternatively, the recording media may correspond to an integrated circuit in which the program is incorporated, the circuit being adapted to execute or to be used in the execution of the method in question.

6. LIST OF FIGURES

Figure 2:
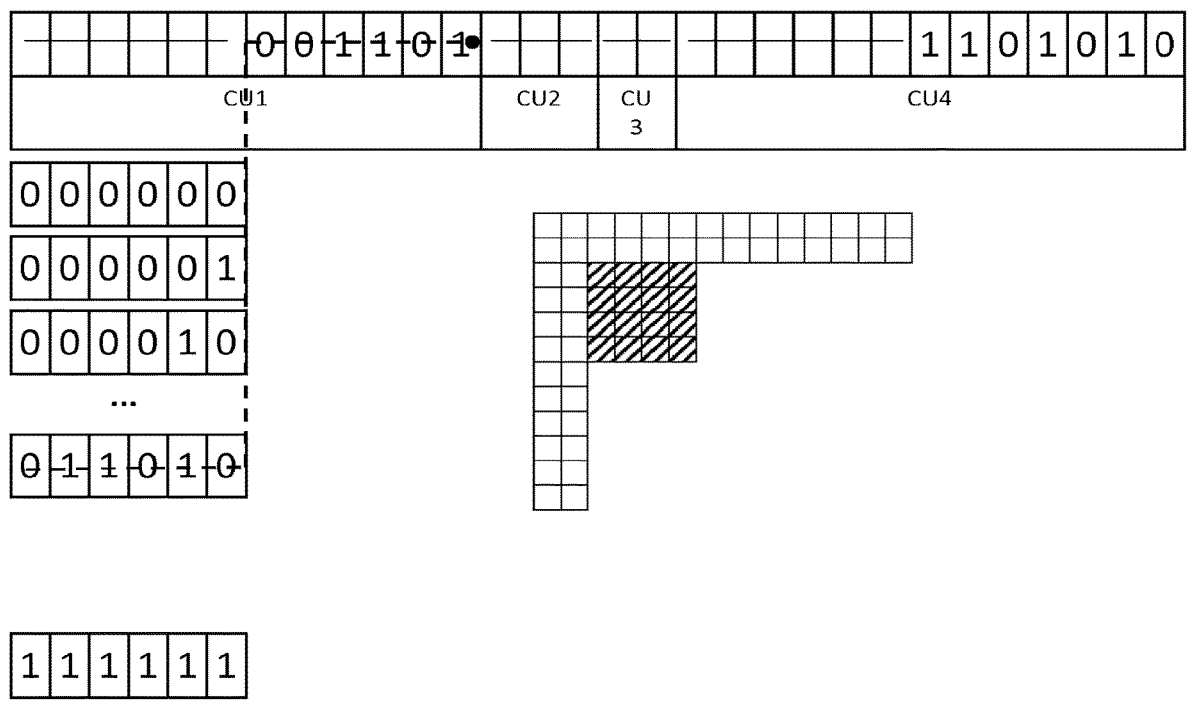
Figure 3:
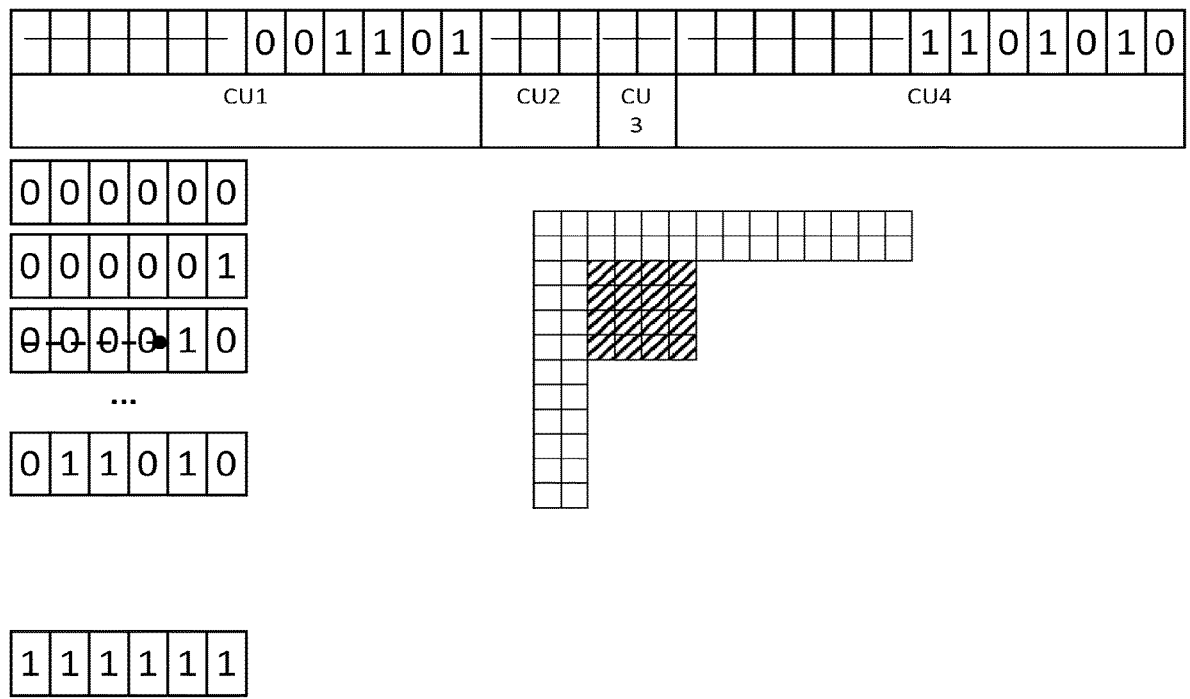
Figure 4:
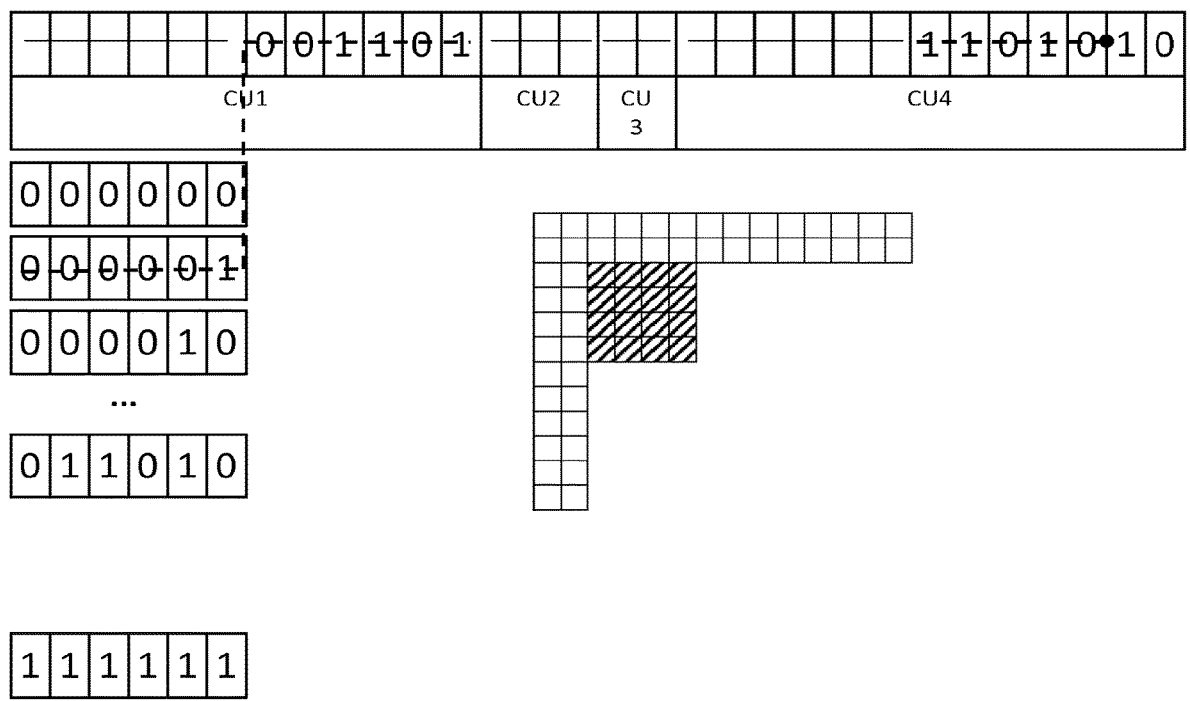
Figures 5, 6:
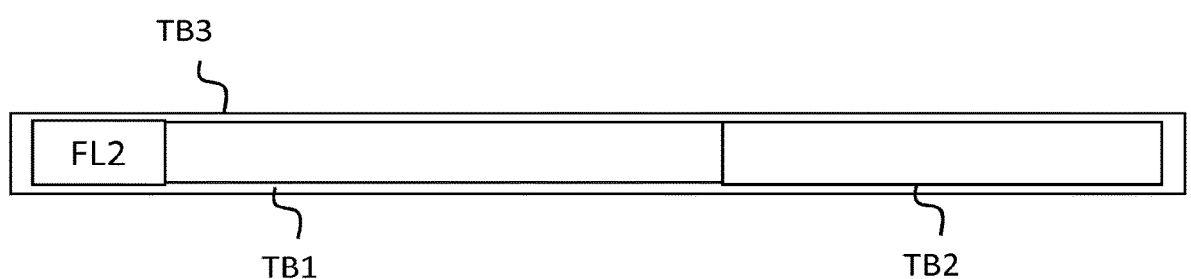
Figure 7:
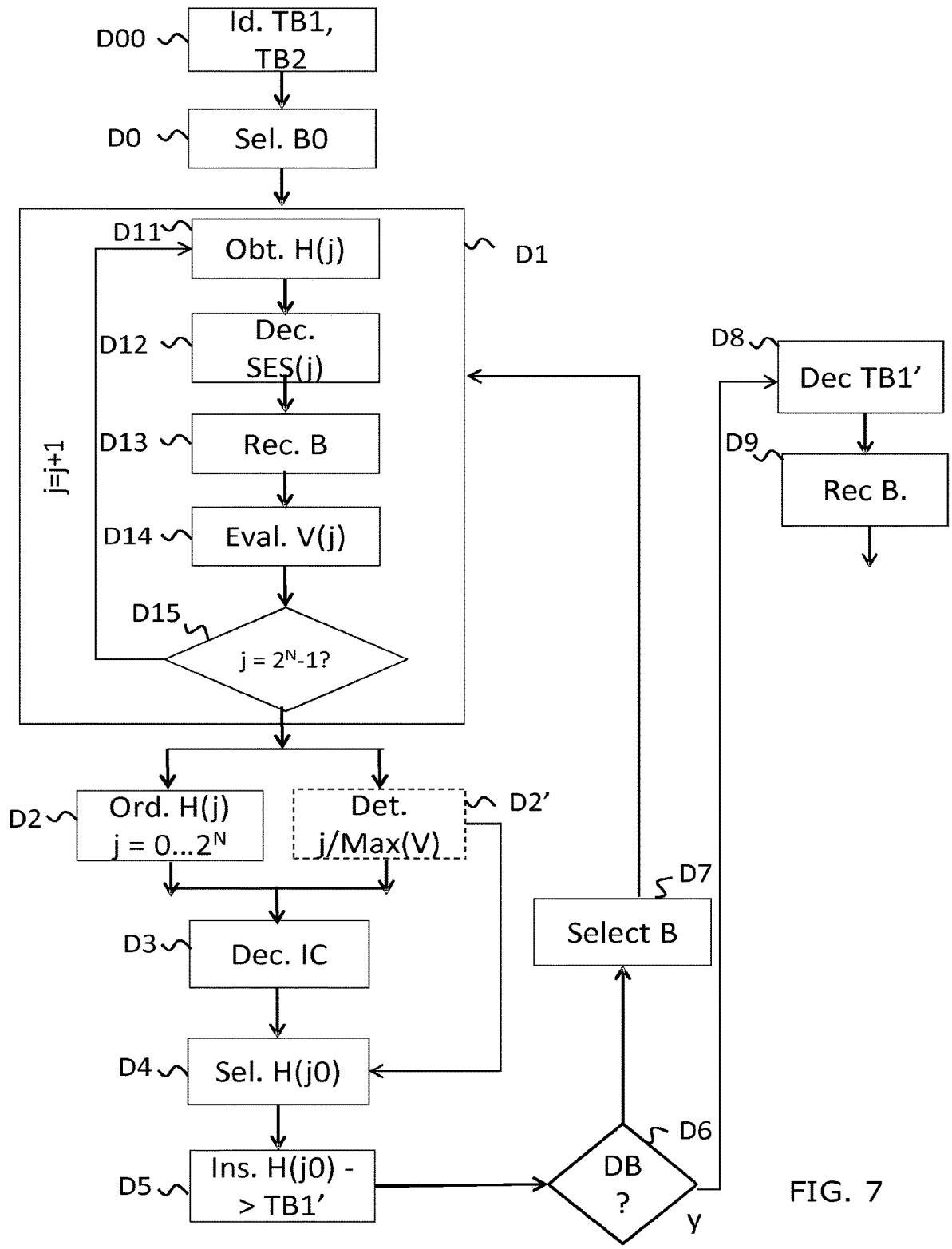
Figure 8:
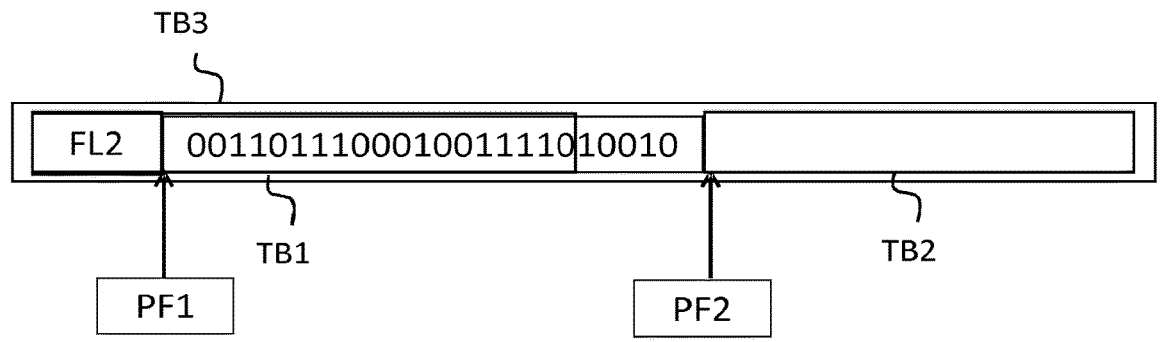

Other features and advantages of the invention will appear more clearly on reading the following description of an embodiment of the invention, given as a simple illustrative and non-limiting example, and the appended drawings among which:

FIG. 1 schematically shows the method of coding an image according to an embodiment of the invention;

FIGS. 2, 3 and 4 schematically illustrate the step of decoding a current block from a sequence of tested bits and from coded data of the first stream portion;

FIG. 5 schematically illustrates an example of cost measurement calculated to evaluate a likelihood measurement associated with a hypothesis tested for the current block;

FIG. 6 schematically illustrates an exemplary structure of a data stream comprising first and second stream portions according to the invention;

FIG. 7 schematically shows a method of decoding an image according to an embodiment of the invention;

FIG. 8 schematically illustrates the step of reading coded data in the first and second stream portions using a first and a second pointers.

Figure 9:
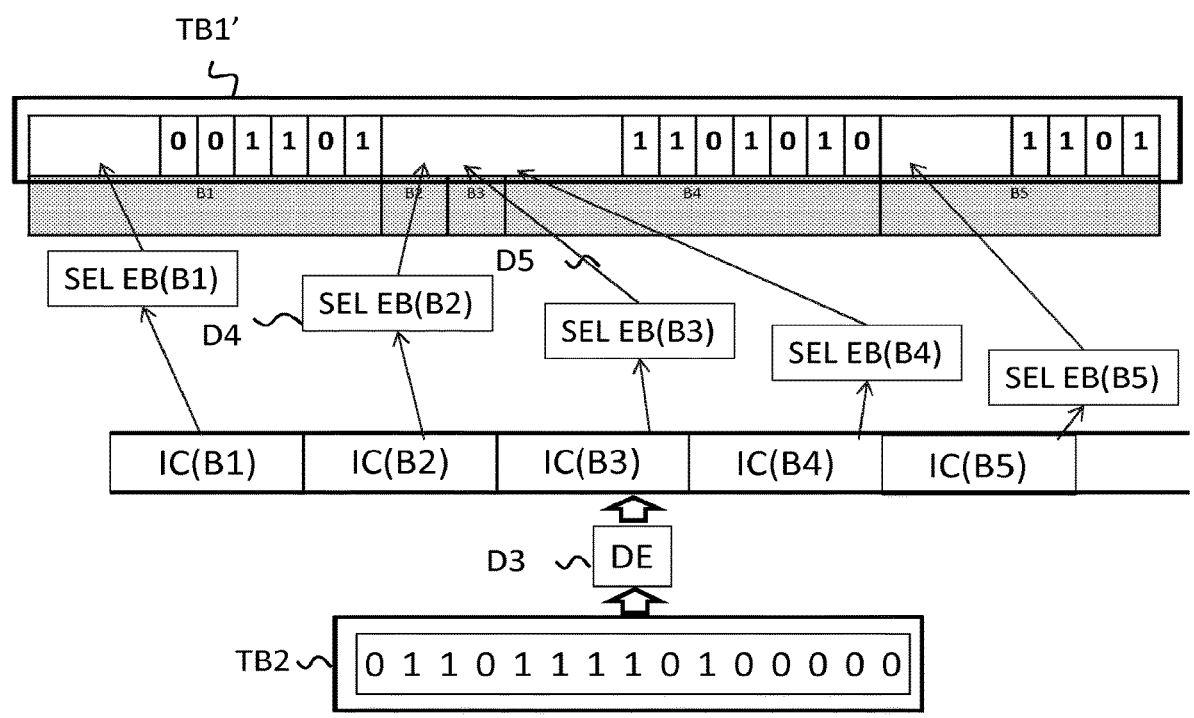
Figure 10:
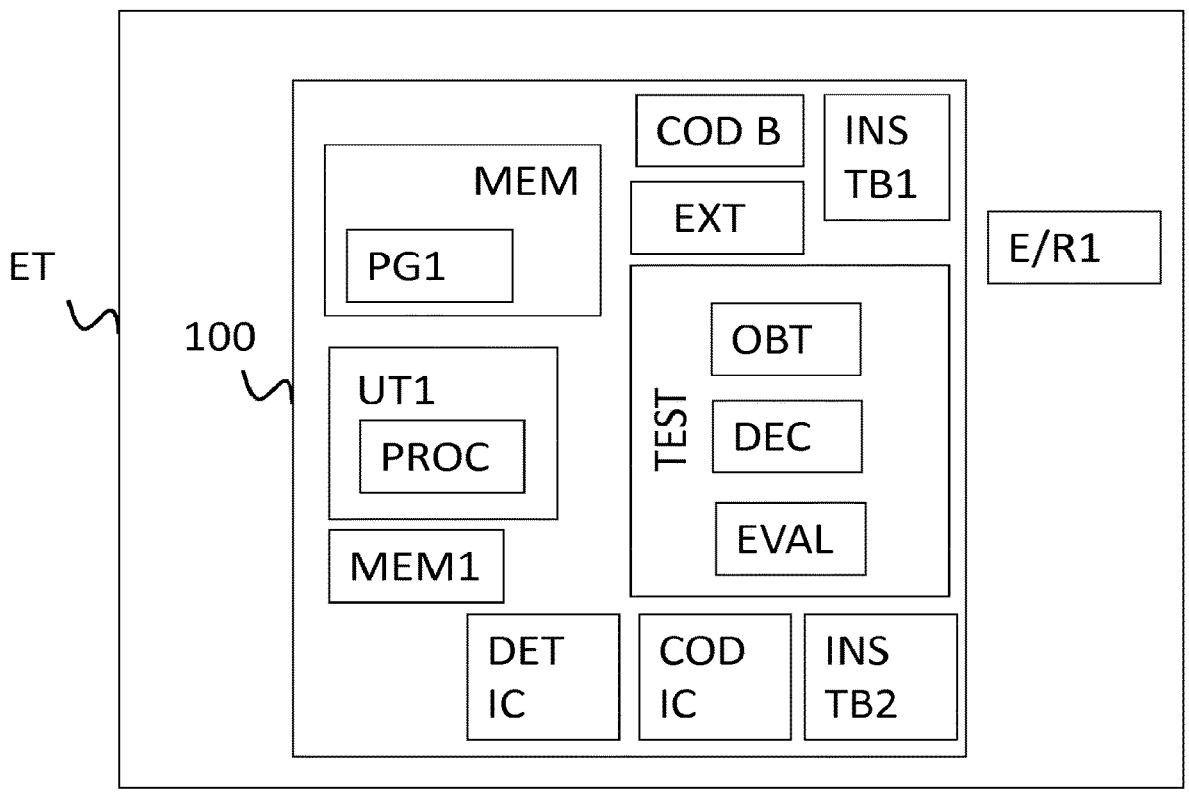
Figure 11:
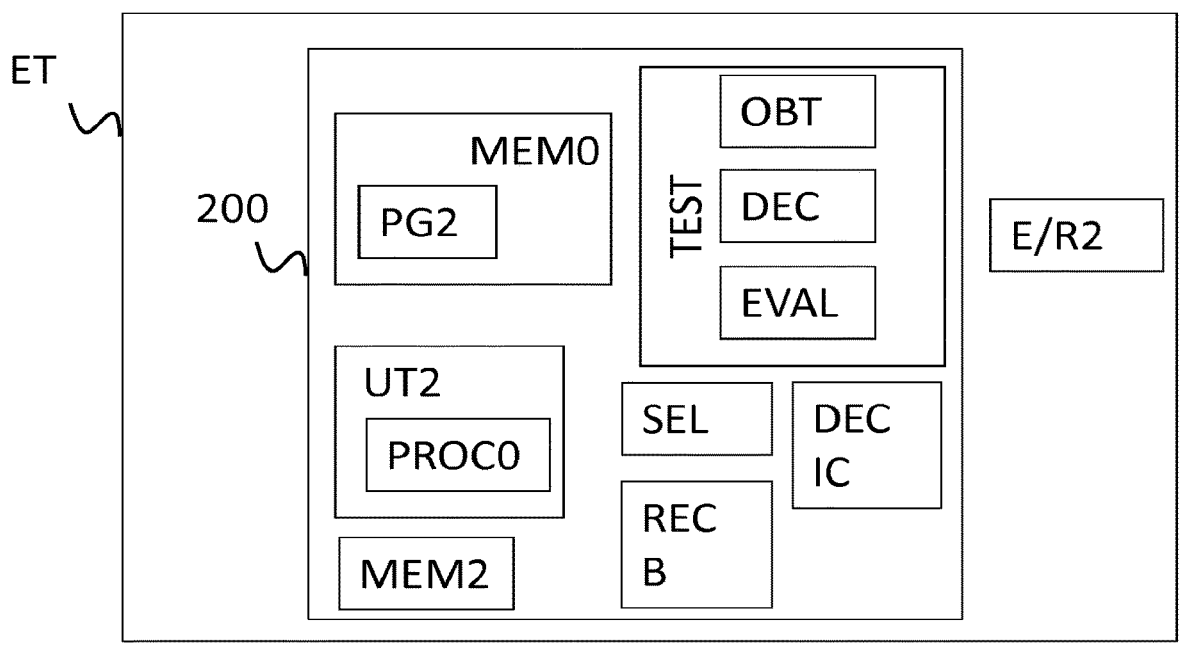

FIG. 9 schematically illustrates the step of decoding/reconstructing a current block from coded data and from the sequence of bits identified by the decoder;

FIG. 10 schematically shows the hardware structure of a coding device according to an embodiment of the invention; and FIG. 11 schematically shows the hardware structure of a decoding device according to an embodiment of the invention.

7. DESCRIPTION OF A PARTICULAR EMBODIMENT OF THE INVENTION

7.1 General Principle

The general principle of the invention is based on the coder side on deletion of a subset of the binary symbols forming the coded data of a current block and on the transmission of a coded data stream comprising, in a first portion, the truncated coded data and, in a second portion, a piece of information characteristic of the deleted sequence.

The decoder according to the invention decodes the information and then reconstructs the sequence of binary symbols using the decoded information.

7.2 Description of an Embodiment of a Coding Method According to the Embodiment In relation to FIG. 1, the steps of a method of coding an image according to a first embodiment of the invention are described.

In the following, we consider an original video consisting of a sequence of M images $I1, I2, \ldots IM$. The images are encoded in a predefined order known from the encoder and the decoder, for example in the time order $I1$, then $I2, \ldots$, then $IM$ (this order may differ according to the embodiment).

The coding method according to the invention comprises two phases, a first phase of forming a first portion of coded data streams and a second phase of forming a second stream portions.

7.2.1 Forming a First Stream Portion

During encoding, the image Im is subdivided into blocks of variable size whose processing order is known to the encoder and the decoder. Each block will undergo an encoding operation consisting of a sequence of operations (applying several steps: prediction, calculation of residue, quantisation, entropy coding) which will be detailed later.

7.2.1.1 Selecting a First Block

During this step E0, the first block to be processed is selected as the current block B. In the preferred embodiment, it is the first block (in lexicographic order).

7.2.1.2 Coding the Current Block into Syntax Elements

During this step E1, this block B will be encoded in a conventional manner, for example as described in the HEVC video coding standard.

This step typically consists in predicting the current block using pixels previously processed in the same image or in a previously processed image, in producing a residual representative of the difference between the prediction and the true values of the pixels of the current block, in transforming this residue by a frequency transform, such as a DCT, for example, in quantifying this transformed residue. Each of these (non-exhaustive) operations can produce syntax elements which are values indicative of e.g., the type of prediction used, the type of transform used, the division of the current block into sub-blocks, the value and sign of quantified residues, etc.

7.2.1.3 Coding the Syntax Elements

During this step E2, each syntax element is then coded by entropy coding, for example of the CABAC type as specified in the HEVC standard. This step therefore transforms the syntax elements into a series of binary symbols 0 and 1. This sequence of binary symbols represents the current block.

Entropic coding consists in exploiting the distribution of syntax elements to reduce the bit rate. For example, for a syntax element taking multiple values, a short binary code will be assigned to the frequent values and a long binary code to the rare values. This makes it possible to reduce, on average, the number of bits necessary for the coding of these values. The Morse code is an example of an entropy code adapted to the statistics of the letters (which in this case are the syntax elements) in the English language. The Huffman code is a technique for constructing a binary code adapted to a given statistic, with the principle that each syntax element is encoded by an integer number of bits. Arithmetic coding makes it possible to pool bits between several syntax elements, and thus to encode a syntax element on a non-integer number of bits.

The bit sequence from the entropy encoding step is added to an intermediate bitstream TB0, comprising the coded data of the blocks already processed.

7.2.1.4 Determining an EB Set of N Bits of the Intermediate Bitstream Associated with the Coding of the Current Block B During this step E3, we determine what would be, for the current block, the first bit that needs to be read in the intermediate compressed stream if one tried to decode this bitstream from conventional means such as a HEVC decoder. According to an embodiment of the invention, a stream pointer PF0, that is moved as and when reading coded data in the stream, is used during decoding.

This step E3 can be performed during the encoding of said current block, or by simulating its decoding.

Then, a sequence of bits is identified. These are consecutive bits situated after (and including) the first bit and before the last bit that needs to be read for decoding the current block, within the limit of N bits, where N is a fixed number. These bits form a set of EB bits having a given value. Thus, let us take an example where N is 4, for the current block, the EB bits are for example 1011. Note that if the current block is coded on fewer than N bits, the set EB itself contains fewer than N bits.

In an alternative embodiment, the N bits EB are the last N bits read during the decoding of the current block.

7.2.1.5 Creating the First Stream Portion from the Encoding Data

During this step E4, the determined bits EB are eliminated from the intermediate bitstream TB0 and the remaining bits are added to a second bitstream TB1, which will be referred to hereinafter as the first stream portion. In other words, the second bitstream TB1 is therefore constituted for each block of the binary symbols of the first bitstream TB0 from which the EB bits associated with each block are removed.

Note that in an alternative embodiment, it is possible to combine this stage with the previous one: in this case, we shall not use an intermediate bitstream TB0, but the bits representative of the binary coded data of the current block, except for the EB bits, be written directly in the first stream portion TB1.

7.2.1.6 Last Block Test

During this step D5, whether the current block is the last block to be processed by the decoder, will be tested, given the browsing order defined above. If so, the next step is the step of selecting the first block. If not, the next step is the coding step E1 of the new current block into syntax elements.

7.2.1.7 Next Block

During this step E6, the next block B to be treated according to the process just described, will be selected. This block becomes the current block to be processed, and the next step is the prediction step.

At this point, all the blocks of the current frame have been processed a first time and a portion of the coded data for the current block has been inserted into the first stream portion TB1.

7.2.2 Forming a Second Portion of Coded Data Streams

During a second phase of the encoding method according to the invention, a second stream portion TB2 is formed as follows:

7.2.2.1 First Block Selection

During this step E7, the first block to be processed is selected as the current block B. In the preferred embodiment, it is the first block (in lexicographic order).

7.2.2.2 Sequence Test

During this step E8, the $2^N$ sequences of N possible binary symbols or hypotheses are tested to replace the sequence of bits EB that has been removed from the bitstream TB0 for the current block. The goal is to go through all the hypotheses and reconstruct the current block for each of them. For example, if EB contains 4 bits, we will test 16 hypotheses.

7.2.2.2.1 Obtaining a Hypothesis

In E81, a hypothesis, distinct from those previously processed, is selected for the bits EB associated with the current block, for example according to an order of increasing value of the number formed by the sequence of bits.
In the case where N is 4, we have:
Hypothesis number 0, H(0)=0000
Hypothesis number 1, H(1)=0001
Hypothesis number 2, H(2)=0010
...
Hypothesis number 15, H(15)=1111
The first hypothesis tested is therefore the hypothesis H(0)=0000.

7.2.2.2.2 Determination of Syntax Elements Under the Current Hypothesis

During this step E7, the current block is decoded using hypothesis number H(i) for the set of bits EB.

In connection with FIGS. 2, 3 and 4, an exemplary embodiment is considered according to which the bits EB have been extracted from the first binary element representative of the current block. It is assumed that this position is pointed by a first stream pointer PF1. It corresponds to a bit reading position of the stream TB1.

The decoding operation therefore consists in decoding the syntax elements of the block from at least a portion of the EB bits of the current hypothesis followed (if necessary, because the decoding of the block can be completed before) of the bits of the first stream portion TB1 relative to the current block. This decoding produces a sequence of syntax elements SES(i), where i is the number of the current hypothesis.

In the example of FIG. 2, the bit sequence H(i) is completely read as well as the bits of the first portion of streams associated with the current block, starting from the position of the pointer PF1.

In the example of FIG. 3, the bit sequence H(i) is not completely read, because the decoder built into the encoder has obtained the values of the syntax elements which it needs with the help of first bits of the sequence according to this hypothesis and therefore did not need it. We can therefore assume that the hypothesis H(i) does not correspond to the bit sequence extracted from TB0.

In the example of FIG. 4, the bit sequence EB(i) is completely read as well as the bits of the first portion of streams associated with the current block, situated beyond the limits of the coded data of the current block. We can therefore assume that the hypothesis H(i) does not correspond to the bit sequence extracted from TB0.

At the end of this decoding, we have the sequence of syntax elements SES(i) for the hypothesis i.

7.2.2.2.3 Reconstructing the Block Associated with the Current Hypothesis

During this substep E82, for the hypothesis H(i), a decoded version VB(i) of the current block is reconstructed. It is constructed from the syntax elements SES(i) read in the first stream portion and/or in the sequence that corresponds to the hypothesis.

7.2.2.2.4 Evaluating a Likelihood Measurement Associated with the Decoded Block During this substep E83, we will evaluate a cost associated with each decoded version of the current block VB(i). In the preferred embodiment and in connection with FIG. 5, this approach is to extrapolate a series of values $\{rj\}$ as follows. Let us assume that the current block is a 4×4 pixel block. Pixels located immediately to the left and above the current block are referred to as A1, A2, . . . , A8. The pixels to the left and above of pixels A1, A2, . . . , A8 are referred to as B1, B2, . . . , B8. The extrapolated $\{rj\}$ values are calculated as follows:

$$r1=2\cdot A1-B1$$

$$r2=2\cdot A2-B2$$

$$r3=2\cdot A3-B3$$

$$r4=2\cdot A4-B4$$

$$r5=2\cdot A6-B6$$

$$r6=2\cdot A7-B7$$

$$r7=2\cdot A8-B8$$

Then, the cost C (i) of the hypothesis H (i) is calculated as follows:

$$C(i)=|r1-X1|+|r2-X2|+|r3-X3|+|r4-X4|+|r5-X5|+|r6-X6|+|r7-X7|$$

where X1, X2, X3, X4 are the pixel values of the first column of the block VB(i) et X4, X5, X6, X7 the pixel values of the first line of this block.

We see that this cost measurement is representative of the discontinuity along the boundaries of the block.

In alternative embodiments, other cost measurements can be used. For example, the sum of the inter-pixel differences of all the pixels inside the block can be chosen. Alternatively, an energy of the residue of the current block can be calculated.

A likelihood measurement $V(i)=-C(i)$ can be deduced therefrom. The higher the cost of the hypothesis H(i), the less probable the hypothesis.

7.2.2.2.5 Testing the Last Hypothesis

During this step (not shown), it will be checked whether the current hypothesis H(i) is the last hypothesis to be tested on the bits EB. In the preferred embodiment where the binary values are tested in classical ascending order, whereby this test consists in checking whether the value only contains 1s.

If this is the case, proceed to step E9 for determining a characteristic information of the sequence EB. Otherwise, return to step E81 to test the next hypothesis.

7.2.2.3 Determination of a Characteristic Information of the Binary Symbol Sequence EB All the hypotheses have been tested.
In a first embodiment of the invention, the sequences tested in E91 are sorted according to a decreasing likelihood measurement order and the value of a characteristic information IC of the bit sequence EB is determined during a step E92, which corresponds to a rank of the correct hypothesis H(i) (ie the value H(4)=1011 in our example) in a table which contains all the hypotheses classified by increasing cost or by decreasing likelihood measurement. Thus, it can be found that the hypothesis 1011 is the 4th among the 16 combinations ranked by increasing cost. We will then assign the value 4 to a syntax element DS associated with the current block.

Of course, other types of characteristic information may be used. Thus, in a second embodiment, the sequence S(i) is identified in E91', which corresponds to the most probable hypothesis, that is to say the one whose cost is the lowest. Then the sequences EB and S (i) in E92' are compared bitwise, and a piece of information characteristic IC=BDIFF representative of equality or inequality between the bits is constructed. For example, the first step may be to compare the values of the most significant bit of EB and SEB (i), and then to transmit BDIFF=0 if they are different and BDIFF=1 if they are equal. Then, the same method is applied to the second most significant bit, and the process is repeated until the least significant bit. It is found that most often, the bits are equal. BDIFF therefore takes more often the value 1 than 0.

7.2.2.4 Coding of a Characteristic Information of the Bit Sequence in the Second Stream Portion During this step E10, it encodes the value of information characteristic IC determined by entropy coding, conventionally, for example with a CABAC encoder. The encoded value is inserted into the second stream portion TB2.

With respect to the first embodiment, the cost associated with the correct combination tends to be low, so the value of DS is often small. The result is therefore a non-uniform statistical distribution of the DS occurrences over all the possible values, which makes it possible to reduce the bit rate, by using a conventional entropy coder (Huffman coding, arithmetic coding), adapted to the DS statistic.

With respect to the second embodiment, the most probable sequence is generally close to the correct sequence so that the bitwise difference has a value that is often small. The statistical distribution of the occurrences is in this case also non-uniform which allows the entropic coder to carry out an effective compression.

7.2.2.5 Last Block Test

During this step E11, whether the current block is the last block to process will be tested, given the browsing order defined previously. If so, the next step is the step E13 of concatenating the first and second stream portions TB1 and TB2. If no, the next step is the step of selecting the next one.

7.2.2.6 Next Block

During this step E12, the next block to be processed by the encoding unit is selected, as described previously. This block becomes the current block to be processed, and the next step is the step of selecting the first hypothesis.

7.2.2.7 Concatenation of the Bits

During this step E13, the first and the second stream portions TB1 and TB2 will be concatenated to constitute the final bit stream TB3 that can then be stored or transmitted to the decoder. The concatenation can be done by juxtaposition as shown in FIG. 6, or by multiplexing the bits of the streams TB1 and TB2, or by any other way to combine the two streams, provided that it allows the decoder to distinguish them.

This step may include further inserting into the final stream TB3 a piece of information for identifying the location of the second portion stream TB2. For example, if the streams TB1 and TB2 are juxtaposed in this order, a piece of information will be inserted before the first stream TB1 to indicate where the beginning of the stream TB2 in the final data stream TB3. This is for example a flag FL2 which includes an address corresponding to the beginning of the second portion TB2.

7.3 Description of an Embodiment of a Decoding Method According to the Invention In the following, we consider a decoder that has received the bit stream TB3 produced by the coding method according to the invention and describes a decoding method according to the invention in connection with FIG. 7.

7.3.1 Identification of the First and Second Portions TB1, TB2 in the Bitstream TB3

During this step D00, the first portion of the stream TB1 comprising at least a portion of the coded data of the blocks of the image and a second portion of the stream TB2 comprising the information IC will be identified, which are characteristic from the missing binary symbol sequences in the first stream portion.

In relation to FIG. 8, it is assumed that the first and second stream portions are juxtaposed, with TB1 followed by TB2, and in the stream TB3, a piece of information FL2 representative of a start position of the second stream portion TB2 in the complete stream TB3. Thus, technically, the decoder conventionally uses a first file pointer PF1 whose position is initialised at the beginning of the stream TB3 and which moves in the first portion of the stream as the decoding progresses and according to the invention, a second file pointer PF2, the position of which is initialised at the address indicated by the flag FL2 and which moves in the second stream portion as the decoding progresses.

7.3.2 First Block Selection

This step D0 is identical to that implemented in the coding.

7.3.2 Data Processing of the First Stream Portion for the Current Block

7.3.2.1 Testing Size-N Bit Sequences

During this step D1, the $2^N$ sequences of binary symbols N or hypotheses H(j) possible are tested with j integer between 1 and $2^N-1$. The goal is to go through all the hypotheses. For example, if sub-assembly EB contains N=4 bits, 16 hypotheses will be tested.

For example, the hypotheses are browsed according to a predetermined order as already described in section 7.2.2.2.1 for the coding method according to the invention and the following steps are carried out:

7.3.2.1.1 Obtaining a Hypothesis H(j)—Substep D11

The result is a hypothesis among the hypotheses not yet processed.

7.3.2.1.2 Determination of the Syntax Elements Corresponding to the Current Hypothesis H(j)—Sub-Step D12

Let us assume that the sequence of N bits EB was extracted by the encoder at the beginning of the encoded data of the current block B. The decoder reproduces the operation of the encoder and begins by decoding the bits of the sequence of the current hypothesis H(j) to determine the values of the syntax elements SES(j) that it needs to decode the current block.

Several scenarios can arise:
- the decoder has not decoded all the syntax elements it needs from the N bits of the sequence H(j). It continues its decoding by reading the data of the first stream portion TB1 from the current position of the pointer PF1 that it moves as and when it is read,
- the decoder has decoded all the syntax elements it needs for the current block from the N bits of the sequence H(i). In this case, it does not move the pointer PF1 and does not read information in the first stream portion TB1;
- the decoder has decoded all the syntax elements it needs from the first M<N bits of the sequence H(i). It keeps only those and if the sequence H(i) proves to be the correct hypothesis, it inserts only those in the first stream portion TB1.

It will be noted that this step generally comprises an entropic decoding sub-step DE of the bits read in the hypothesis H(j) or in the first stream portion TB1.

7.3.2.1.3 Reconstruction of the Current Block from the Decoded Syntax Elements—Substep D13

During this substep D13, for the hypothesis H(j), a decoded version VB(i) of the current block is reconstructed. It is constructed from the syntax elements SES(j) determined in D12. For example, in a decoding scheme type HEVC, the determined syntax elements make it possible to obtain a residual of the current block that is added to a prediction of this block made from neighbouring blocks already decoded and reconstructed.

7.3.2.1.4 Calculation of a Likelihood Measurement Associated with the Reconstruction of the Current Block with the Bits of the Sequence of the Current Hypothesis—Substep D14

In a manner similar to that described for the coding method, this substep D14 calculates a likelihood measurement V(j) associated with the current hypothesis H(j). In one embodiment, this measurement is chosen equal to the opposite of a cost representative of a discontinuity at the boundaries of the current block with neighbouring blocks already processed and reconstructed.

7.3.2.1.5 Testing the Last Hypothesis—D15

This step is identical to that implemented in the coding.

Once all the hypotheses have been processed, each of them will correspond to elements of syntax associated with the current block and a likelihood measurement.

7.3.2.2 Scheduling Hypothesis Based on the Calculated Likelihood Measurement In the first embodiment of the invention, in a manner analogous to that described for the coder, the hypotheses are sorted in D2 from the most probable to the least probable one. Thus, an ordered list is formed according to an order corresponding to a decreasing likelihood measurement.

In a second embodiment of the invention, corresponding to that described for the coder, the most probable hypothesis is determined in D2', that is to say the one that maximizes the estimated likelihood measurement.

7.3.3 Reading a Piece of Information Characteristic of the Bit Sequence Extracted by the Coder in the Second Stream Portion TB2

During this step D3, a syntax element DS representative of a piece of information characteristic of the correct hypothesis will be read in the second stream portion TB2. In connection with FIG. 9, the decoder starts reading from the current position of the pointer FP2 of the second portion stream. It thus carries out in D3 a conventional entropic decoding DE, for example of the CABAC type, to decode the value of the information IC characteristic of the sequence extracted by the encoder.

In a first embodiment of the invention, the information IC is a rank DS.

In a second embodiment, the information IC is a bitwise difference with the most probable sequence determined.

7.3.4 Identification of the Correct Hypothesis from the Elements of Syntax SES(j0) and the Syntax Element IC Read During this sub-step D4, the correct hypothesis H(j0) for the bits EB is identified from the characteristic information IC decoded. In the first embodiment, it corresponds, in the ordered list of hypotheses, to the one with the rank DS. In the second embodiment, it corresponds to the hypothesis H(j0) whose bit sequence has a bitwise difference with the most probable sequence that is equal to IC.

7.3.4 Writing the Bits of the Correct Hypothesis in the First Stream Portion TB1

During this step D5, at least a portion of the determined bits EB is inserted into the first portion of the stream TB1 at the point where they were deleted by the encoder.

Note that if, during the determination of the syntax elements SES (j) (D12), the decoder did not need to read all the bits of the sequence H(j0) to decode the syntax elements of the current block, then, to complete the first stream portion TB1, it retains only the bits of the correct hypothesis H(j0) that it actually used. In other words, the sequence of bits determined as the correct hypothesis comprises a number of elements less than the predetermined number N, which corresponds to the example already described in FIG. 3.

In this embodiment, a new complete encoded data stream TB1' is reconstructed from the first stream portion TB1 received and bit sequences associated with each block.

It will be noted that this step D5 for reconstructing a complete bitstream TB1' is optional, insofar as the syntax elements associated with the current block have already been decoded and the pixels of the current block already reconstructed.

They can simply be stored in a memory MEM2 during a step D5' so as to display the current image reconstructed.

Nevertheless, it will be noted that there are finite state entropic decoders. These decoders include internal variables. When decoding a portion of a bitstream, the decoded value depends on the value of the internal variables, and the internal variables are updated and thus possibly modified. An example of finite state entropic decoding is the CABAC decoder used in the HEVC standard. When resorting to a finite state entropy decoder, the entropy decoder must again adopt the state it had reached when decoding the current block before starting the next block. To do this, two options can be considered:
  either rebuild in D5 the complete stream TB1 as previously described in order to allow the entropic decoder to redo the complete decoding of the bits corresponding to each block and this way to adopt the state it had reached for the correct hypothesis;
  or store in D5', in addition to the syntax elements, or pixels decoded for the current block, the state of the entropy decoder corresponding to each hypothesis, so that the entropic decoder is repositioned on the state corresponding to the correct hypothesis before starting to decode the next block

7.3.5 Last Block Test

During this step D6, it is tested whether the current block is the last block to be processed by the decoding unit. If yes, the coder has finished processing. If no, the next step is the step of selecting the next block.

7.3.6 Selecting the Next Block

During this step D7, the next block B to be processed by the decoder is selected, as described previously. This block becomes the current block to be processed, and the next step is the step D1 of testing the hypotheses.

At the end of these steps, all the blocks have been processed and the stream portion TB1 thus reconstructed corresponds to the intermediate data stream TB0 described in the embodiment of the coding method.

In the case where the step D5 for reconstructing a completed stream TB1' is not implemented, the entropic decoder is positioned on the state ET associated with the correct hypothesis $H(j_0)$ for the block which has just been processed.

7.3.7 Decoding the Completed Bitstream TB1'

During this step D8, the bitstream TB1' completed by conventional means, such as decoding according to the HEVC standard, is decoded. This step is optional. It only concerns the case where the reconstruction step D5 has been implemented.

It will be noted that the invention which has just been described can be implemented by means of software and/or hardware components. In this context, the terms "module" and "entity", used in this document, can correspond either to a software component, or to a hardware component, or to a set of hardware and/or software components, capable of implementing the function(s) described for the module or entity concerned.

In relation to FIG. 10, an example of a simplified structure of a device 100 for coding a digital image according to the invention is now presented. The device 100 implements the coding method according to the invention which has just been described in relation with FIG. 1.

For example, the device 100 comprises a processing unit UT1 110, equipped with a processor µ1, and driven by a computer program $Pg_1$ 120, stored in a memory 130 and implementing the method according to the invention.

At initialisation, the code instructions of the computer program $Pg_1$ 120 are for example loaded into a RAM before being executed by the processor of the processing unit 110. The processor of the processing unit 110 implements the steps of the method described above, according to the instructions of the computer program 120.

In this exemplary embodiment of the invention, the device 100 comprises at least one coding unit of the current block in a plurality of coded data, an extraction unit EXT of the plurality of coded data of a first sequence comprising a predetermined non-zero number of binary symbols, an INS insertion unit in a first bitstream portion of the coded data not belonging to the extracted sequence. It further comprises a sequence test unit TEST comprising the predetermined non-zero number of binary symbols, able to implement at least two iterations of the following substeps:
  obtaining OBT a sequence distinct from the sequences already tested;
  decoding DEC and reconstructing a version of the current block from the sequence of binary symbols obtained and from coded data read in the first stream portion;
  evaluating EVAL a likelihood measurement associated with the sequence obtained from the version of the reconstructed block;

It finally comprises a unit of determining DET IC a piece of information characteristic of the first sequence from the likelihood measurements associated with the sequences tested, a coding unit COD I C of said piece of information and a unit of inserting INS IC the encoded information in a second portion of the stream.

It also includes a unit MEM1 for storing the likelihood measurements evaluated for each sequence tested. The memory MEM1 can also temporarily store the reconstructed blocks for each hypothesis by the decoder integrated in the encoder.

These units are driven by the processor µ1 of the processing unit 110.

Advantageously, such a device 100 can be integrated into a user terminal equipment ET. The device 100 is then arranged to cooperate at least with the next module of the terminal ET:
  a data transmission/reception module E/R1, through which the bit stream TB or the compressed file FC is transmitted over a telecommunications network, for example a wired network or a radio network;

In relation to FIG. 11, an example of a simplified structure of a device 200 for decoding a digital image according to the invention is now presented. The device 200 implements the decoding method according to the invention which has just been described in relation with FIG. 7.

For example, the device 200 comprises a processing unit UT2 210, equipped with a processor µ2, and driven by a computer program $Pg_2$ 220, stored in a memory 230 and implementing the method according to the invention.

At initialisation, the code instructions of the computer program Pg$_2$ 220 are for example loaded into a RAM before being executed by the processor of the processing unit 210. The processor of the processing unit 210 implements the steps of the method described above, according to the instructions of the computer program 120.

In this exemplary embodiment of the invention, the device comprises a sequence test unit TEST comprising a predetermined non-zero number of bits, said unit being able to implement at least two iterations of the following sub-units, for said current block:

obtaining OBT a sequence distinct from the sequences already tested;

decoding DEC and reconstructing a version of the current block from the bit sequence obtained and from coded data read in the first stream portion;

evaluating EVAL a likelihood measurement associated with the sequence obtained from the version of the reconstructed block; and It further comprises the following steps:

decoding DEC ID a piece of information characteristic of a first sequence comprising the predetermined non-zero number of binary symbols from the second stream portion;

selecting SEL a sequence identified as the first sequence among said at least two sequences tested, based on the measured likelihood measurement and the decoded information; and decoding and reconstructing REC B the current block from the sequence and the first stream portion.

The device 200 also includes a unit MEM2 for storing the likelihood measurements evaluated for each sequence tested. Advantageously, in the embodiment where a second decoding pass is not carried out from a completed stream TB1', it is capable of storing, in addition, the syntax elements or the decoded pixels for the block as well as, where appropriate, the states of the entropy decoder associated with the $2^N$ hypotheses H(j) tested.

These units are driven by the processor µ2 of the processing unit 210.

Advantageously, such a device 200 can be integrated into a user terminal equipment ET. The device 200 is then arranged to cooperate at least with the next module of the terminal ET:

a data transmission/reception module E/R2, through which the bit stream TB3 or the compressed file FC is received from a telecommunications network, for example a wired network or a radio network.

An exemplary embodiment of the present invention improves the situation discussed above with respect to the prior art.

An exemplary embodiment overcomes these disadvantages of the prior art.

More precisely, an exemplary embodiment of the invention proposes a solution that makes it possible to further reduce the size of the coded data stream to be transmitted to a decoder.

It goes without saying that the embodiments which have been described above have been given for purely indicative and non-limiting reasons, and that many modifications can easily be made by those skilled in the art without departing from the scope of the invention.

What is claimed is:

1. A method comprising the following acts performed by a decoding device:

receiving an encoded data stream representative of at least one image from a communications network, said image being divided into blocks, said stream comprising a first portion and a second portion;

decoding the encoded data stream, comprising:

performing, for a current block, a sequence test comprising at least $2^N$ iterations of the following acts, wherein N is a predetermined non-zero number:

obtaining a sequence of N bits, which is distinct from any sequences already tested;

decoding and reconstructing a version of the current block from the sequence obtained and from coded data read in the first stream portion;

evaluating, from the version of the reconstructed block, a likelihood measurement associated with the sequence obtained; and the following acts, implemented for said current block:

decoding a piece of information characteristic of a first sequence comprising N bits from the second stream portion;

selecting the first sequence from the sequences tested, based on the likelihood measurements associated with the sequences tested and the decoded information; and decoding and reconstructing the current block from the first sequence selected and the first stream portion.

2. The method according to claim 1, wherein the method comprises sorting the sequences tested according to associated decreasing likelihood measurement values and the information characteristic of the first sequence comprises a rank of the first sequence among the sorted sequences.

3. The method according to claim 1, wherein the method comprises determining a most probable sequence tested and the information characteristic of the first sequence comprises measuring a bitwise difference between the value of the first sequence and that of the most probable sequence.

4. The method according to claim 1, wherein the act of evaluating a likelihood measurement comprises calculating a distortion measurement of pixel values on both sides of at least one boundary of the current block with a neighbouring block already processed and the likelihood measurement evaluated is inversely proportional to the distortion measurement.

5. The method according to claim 1, wherein the decoding and reconstruction act completes the first stream portion by inserting at least one portion of the bits of the sequence at at least one predetermined position.

6. The method according to claim 5, wherein the determined position is located before the first bit of the coded data associated with the current block.

7. The method according to claim 1, further comprising reconstructing a coded data stream completed from the first stream portion and the selected sequence.

8. The method according to claim 1, further comprising storing the block reconstructed in the non-transitory computer-readable medium.

9. The method according to claim 8, wherein the decoding acts include finite state entropy decoding, and the storing further comprises storing a state of the entropy decoder associated with the selected sequence.

10. A method comprising the following acts performed by a coding device:

coding a coded data stream representative of at least one image, said image being divided into blocks, wherein coding comprises:

the following acts, implemented for a current block:

encoding the current block into a plurality of encoded data;

extracting the plurality of encoded data from a first sequence comprising a predetermined non-zero number (N) of bits;

inserting, into a first portion of the coded data stream bits of coded data which do not belong to the first extracted sequence;

performing a sequence test comprising at least $2^N$ iterations of the following acts:

obtaining a sequence of N bits, which is distinct from any sequences already tested;

decoding and reconstructing a version of the current block from the bits of the sequence obtained and from coded data read in the first stream portion;

evaluating, from the version of the reconstructed block, a likelihood measurement associated with the sequence obtained;

determining a piece of information associated with the first sequence depending on likelihood measurements associated with the sequences tested;

coding said information;

inserting the coded information into a second portion of the encoded data stream; and performing at least one of transmitting the encoded data stream over a communication network or storing the encoded data stream on a non-transitory computer-readable medium.

11. A device comprising:

a processor;

a non-transitory computer-readable medium comprising instructions stored thereon, which when executed by the processor configure the device to perform acts comprising:

receiving an encoded data stream representative of at least one image from a communication network, said image being divided into blocks, said stream comprising a first portion and a second portion;

decoding the encoded data stream, comprising:

performing a sequence test comprising at least $2^N$ iterations of the following acts for a current block, wherein N is a predetermined non-zero number:

obtaining a sequence of N bits, which is distinct from any sequences already tested;

decoding and reconstructing a version of the current block from the sequence obtained and from coded data read in the first stream portion;

evaluating, from the version of the reconstructed block, a likelihood measurement associated with the sequence obtained; and the following acts, implemented for the current block:

decoding a piece of information characteristic of a first sequence comprising the predetermined non-zero number of bits from the second stream portion;

selecting a sequence identified among said at least two sequences tested, based on the measured likelihood measurement and the decoded information, said selected sequence being identified as the first sequence; and decoding and reconstructing the current block from the first sequence and the first stream portion.

12. The device according to claim 11, wherein the device is a user terminal, which comprises a decoding device configured to perform the acts recited in claim 11 and a coding device configured to code at least one digital image.

13. A device comprising:

a processor;

a non-transitory computer-readable medium comprising instructions stored thereon, which when executed by the processor configure the device to perform acts comprising:

coding a coded data stream representative of at least one image, said image being divided into blocks, wherein coding comprises:

the following acts implemented for a current block:

encoding the current block into a plurality of encoded data;

extracting the plurality of encoded data from a first sequence comprising a predetermined non-zero number (N) of bits;

inserting, into a first stream portion, bits of coded data not belonging to the extracted sequence;

performing a sequence test including at least $2^N$ iterations of the following acts:

obtaining a sequence of N bits, which is distinct from any sequences already tested;

decoding and reconstructing a version of the current block from the bits of the sequence obtained and from coded data read in the first stream portion;

evaluating, from the version of the reconstructed block, a likelihood measurement associated with the sequence obtained;

determining a piece of information characteristic of the first sequence depending on likelihood measurements associated with the sequences tested;

coding said information;

inserting the coded information into a second stream portion of the encoded data stream; and performing at least one of transmitting the encoded data stream over a communication network or storing the encoded data stream on a non-transitory computer-readable medium.

14. At least one non-transitory computer-readable medium comprising a computer program stored thereon, comprising instructions for implementing a method of decoding an encoded data stream, when executed by a processor, wherein the encoded data stream is representative of at least one image, said image is divided into blocks, and said stream comprises a first portion and a second portion, and wherein decoding comprises:

receiving the encoded data stream from a communication network;

performing a sequence test comprising at least $2^N$ iterations of the following acts for a current block, wherein N is a predetermined non-zero number:

obtaining a sequence of N bits, which is distinct from any sequences already tested;

decoding and reconstructing a version of the current block from the sequence obtained and from coded data read in the first stream portion;

evaluating, from the version of the reconstructed block, a likelihood measurement associated with the sequence obtained; and the following acts, implemented for the current block:

decoding a piece of information characteristic of a first sequence comprising the predetermined non-zero number of bits from the second stream portion;

selecting a sequence identified among said at least two sequences tested, based on the measured likelihood measurement and the decoded information, said selected sequence being identified as the first sequence; and decoding and reconstructing the current block from the first sequence and the first stream portion.

* * * * *

UNITED STATES PATENT AND TRADEMARK OFFICE
CERTIFICATE OF CORRECTION

| | |
|---|---|
| PATENT NO. | : 10,798,383 B2 |
| APPLICATION NO. | : 16/320798 |
| DATED | : October 6, 2020 |
| INVENTOR(S) | : Felix Henry et al. |

It is certified that error appears in the above-identified patent and that said Letters Patent is hereby corrected as shown below:

On the Title Page

Assignee item (73), Line 11, please delete "B<>COM" and insert --FONDATION B-COM--.

Signed and Sealed this
Fifth Day of March, 2024

Katherine Kelly Vidal
*Director of the United States Patent and Trademark Office*